(12) United States Patent
Erchak et al.

(10) Patent No.: US 6,574,383 B1
(45) Date of Patent: Jun. 3, 2003

(54) INPUT LIGHT COUPLER USING A PATTERN OF DIELECTRIC CONTRAST DISTRIBUTED IN AT LEAST TWO DIMENSIONS

(75) Inventors: Alexei A. Erchak, Cambridge, MA (US); Shanhui Fan, Palo Alto, CA (US); Erich P. Ippen, Belmont, MA (US); John D. Joannopoulos, Belmont, MA (US); Leslie A. Kolodziejski, Belmont, MA (US); Gale S. Petrich, Arlington, MA (US); Daniel J. Ripin, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/845,811

(22) Filed: Apr. 30, 2001

(51) Int. Cl.[7] ............................................... G02B 6/26
(52) U.S. Cl. .......................... 385/15; 385/27; 385/30; 385/28; 385/130; 385/131; 385/122
(58) Field of Search .............................. 385/15, 5, 27, 385/30, 38, 39, 24, 130, 131, 28, 122; 257/98, 94, 432; 372/101

(56) References Cited

U.S. PATENT DOCUMENTS

| | | | |
|---|---|---|---|
| 5,033,812 A | 7/1991 | Yoshida et al. | 385/37 X |
| 5,081,615 A | 1/1992 | Sunagawa | 369/44.12 |

(List continued on next page.)

OTHER PUBLICATIONS

Erwin G. Loewen et al., "Chapter 2, Sections 2.1 and 2.2, Chapter 9, Sections 9.2 and 9.5," *Diffraction Gratings and Applications*, New York, NY, 1997, pp. 25–30, 325–334 340–344. , Mekis et al., Optics Letters, "Two–Dimensional Photonic Crystal Couplers for Unidirectional Light Output," vol. 25, No. 13, pp.: 942–944, Jul. 1, 2000.

(List continued on next page.)

*Primary Examiner*—Brian Healy
(74) *Attorney, Agent, or Firm*—Samuels, Gauthier & Stevens, LLP (57) ABSTRACT

An input light-coupling device comprising a dielectric layer containing a pattern of dielectric contrast distributed in at least two dimensions. The pattern of dielectric contrast, which may or may not be periodic, is designed to facilitate coupling to the dielectric layer of electromagnetic radiation. The electromagnetic radiation may be propagating within a surrounding medium of lower dielectric constant than that of said dielectric layer, input at directions including normal incidence from which light cannot typically couple to the dielectric layer without the presence of the pattern of dielectric contrast. The input light may constitute an optical signal propagating in an optical fiber or in free space. Light that is in-coupled may be directed in as many directions as dictated by the symmetry of the pattern of dielectric contrast. The dielectric layer may contain output waveguides surrounding the input coupling structure. The light coupling structure may be fabricated in a dielectric layer separated from a high-dielectric substrate by a low-dielectric layer to avoid losses of the input signal to the substrate. A mirror comprising either a reflective material or alternating layers of high and low dielectric material may be disposed between the low-dielectric layer and the substrate to enhance the total input coupling to the dielectric layer containing the input coupling structure.

24 Claims, 7 Drawing Sheets

U.S. PATENT DOCUMENTS

| | | | |
|---|---|---|---|
| 5,101,459 A | | 3/1992 | Sunagawa .................... 385/37 |
| 5,526,449 A | | 6/1996 | Meade et al. ................. 385/14 |
| 5,600,483 A | | 2/1997 | Fan et al. .................... 359/344 |
| 5,726,805 A | * | 3/1998 | Kaushik et al. ............. 359/589 |
| 5,784,400 A | * | 7/1998 | Joannopoulous et al. ..... 372/96 |
| 5,955,749 A | | 9/1999 | Joannopoulos et al. ....... 257/98 |
| 5,999,308 A | * | 12/1999 | Nelson et al. .............. 359/321 |
| 6,058,127 A | * | 5/2000 | Joannopoulous et al. ..... 372/92 |

OTHER PUBLICATIONS

Fan et al., Physical Review Letters, "High–Extraction Effciency of Spontaneous Emission from Slabs of Photonic Crystals," vol. 78, No. 17, pp.: 3294–3297, Apr. 28, 1997.

Backlund et al., IEEE Photonics Technology Letters, "Multifunctional Grating Couplers for Bidirectional Incoupling into Planar Waveguides." vol. 12, No. 3, pp. 314–316, Mar. 16, 2000.

Li et al., Proceedings of SPIE: The International Society for Optical Engineering,. "Unidirectional Surface–Normal Waveguide Grating Couplers For Wafer–Scale MCM Interconnect.", vol. 3005, pp.: 136–142, 1997.

Brazas et al, Applied Optics, "Analysis of Input–Grating Couplers Having Finite Lengths." vol. 34, No. 19, pp.: 3786–3792, Jul. 1, 1995.

Boroditsky et al., "Spontaneous Emission Extraction and Purcell Enhancement from Thin–Film 2–D Photonic Crystals", Journal of Lightwave Technology, vol. 17, No. 11, Nov. 1999, pp.: 2096–2112.

Mekes et al., "Two–dimensional photonic crystal couplers for unidirectional light output", Optics Letters, vol. 25, No. 13, Jul. 1, 2000, pp.: 942–944.

Erchak et al., "Enhanced coupling to vertical radiation using a two–dimensional photonic crystal in a semiconductor light–emitting diode", Applies Physics Letters, vol. 78, No. 5, Jan. 29, 2001, pp.: 563–565.

* cited by examiner

Fig. 5

INPUT LIGHT COUPLER USING A PATTERN OF DIELECTRIC CONTRAST DISTRIBUTED IN AT LEAST TWO DIMENSIONS

SPONSORSHIP INFORMATION

This invention was made with government support under Grant Number DMR-9808941 awarded by the National Science Foundation. The government has certain rights in this invention.

BACKGROUND OF THE INVENTION

The invention relates to an input light-coupling device using a dielectric layer containing a pattern of dielectric contrast distributed in at least two dimensions. Hereinafter the term "dielectric constant" is assumed to refer to the real part of the dielectric constant.

A fundamental limitation to the speed of telecommunications is the need to convert an optical signal to an electrical signal. One way to avoid this limitation is to process the signal optically. Optical signal processing requires the transfer of an optical signal from either an optical fiber or free-space (depending on the application) onto a chip. Typically, the input coupling of light introduces losses to the optical signal.

Optical signals propagating through a fiber are usually inserted onto a semiconductor chip by end-firing the optical signal into the waveguide, a practice that can lead to significant insertion losses. For instance, optical fibers are "butt-coupled" to the end of the waveguide using an epoxy. An optical signal carried though free space needs to be focused and inserted at the edge of a semiconductor waveguide. The insertion losses are due to the dielectric contrast and reflectivity associated with the interface between the fiber, or free space, and the semiconductor.

Gratings may be defined in the high-dielectric semiconductor to improve the coupling efficiency, as is described in further detail in Loewen and Popov., *Diffraction Gratings and Applications,* (Marcel Dekker, New York, 1997). An example of a grating coupler is provided in Backlund et al., "Multifunctional Grating Couplers for Bidirectional Incoupling into Planar Waveguides.", IEEE Phot. Tech. Lett. 12, 314 (2000). The grating consists of a one-dimensional periodic perturbation to the dielectric constant. The optical signal no longer needs to be launched at the end of the waveguide but rather may couple from above the grating. Efficient input coupling of light into such structures, however, is limited by the single direction of the periodicity.

SUMMARY OF THE INVENTION

Accordingly, the invention provides a new design for the input coupling of light from a low dielectric medium (such as an optical fiber or free space) to a higher dielectric material (such as a semiconductor). The input coupling structure includes a pattern of dielectric contrast distributed in at least two dimensions, the exact design of which may be scaled, within fabrication limits, to apply to any wavelength of input light. The pattern may be fabricated in a dielectric layer that contains other optical components, e.g., a semiconductor chip, such as waveguides. Efficient input coupling may occur in as many directions as dictated by the symmetry of the structure. Multiple input directions allow an increased flexibility in integrated optic design, an increase in the optical component packing density, and a possible increase in the overall coupling efficiency.

In accordance with an exemplary embodiment of the invention, there is provided a device comprising a dielectric layer containing a two-dimensional periodicity in the dielectric constant of the layer, and separated from a substrate by a low-dielectric spacer layer and a mirror consisting of alternating layers of low and high-dielectric material. Input coupling into directions of high-symmetry is experimentally observed.

DETAILED DESCRIPTION OF THE INVENTION

Figure 1A:
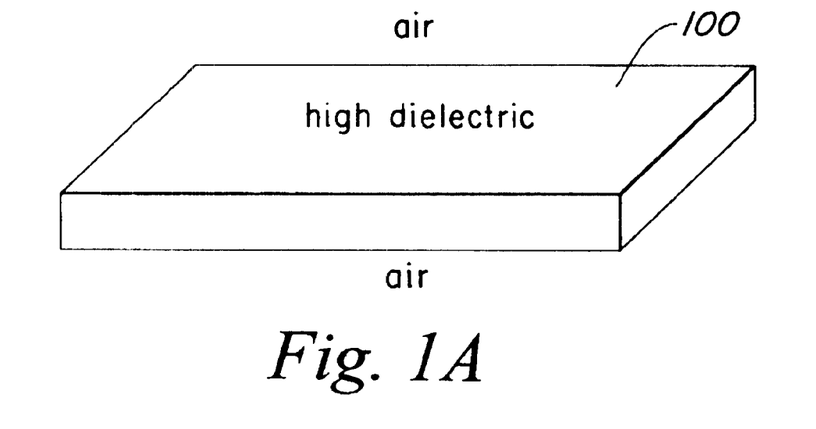
FIG. 1A is a schematic block diagram of an exemplary dielectric layer.
Figure 1B:
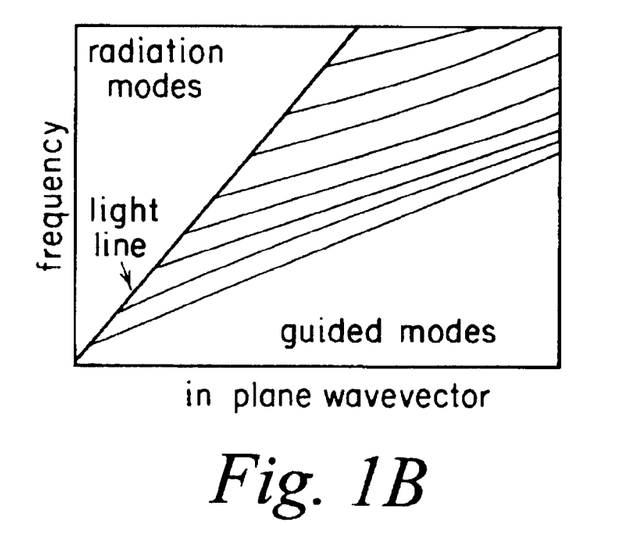
FIG. 1B is a schematic of the typical dispersion relation for the structure in FIG. 1A projected along any direction in the plane of the slab.

FIG. 1A is a schematic block diagram of a simple slab 100 of dielectric material surrounded by a uniform medium, e.g., air, with a smaller dielectric constant than that of the slab. FIG. 1B is a schematic of the typical dispersion relation for the structure in FIG. 1A along any direction in the plane of the slab 100. Frequency is plotted versus the in-plane wavevector.

With reference now to FIG. 1B, the high dielectric contrast between the dielectric slab and the surrounding lower dielectric medium creates guided modes with most of their field intensity concentrated in the high dielectric material. The guided modes are separated from radiation modes by a light-line. Unlike the guided modes, the radiation modes propagate outside the dielectric slab. It will be appreciated by those skilled in the art that radiation modes, which exist only above the light line, cannot couple to guided modes, which exist only below the light line.

Figure 2A:
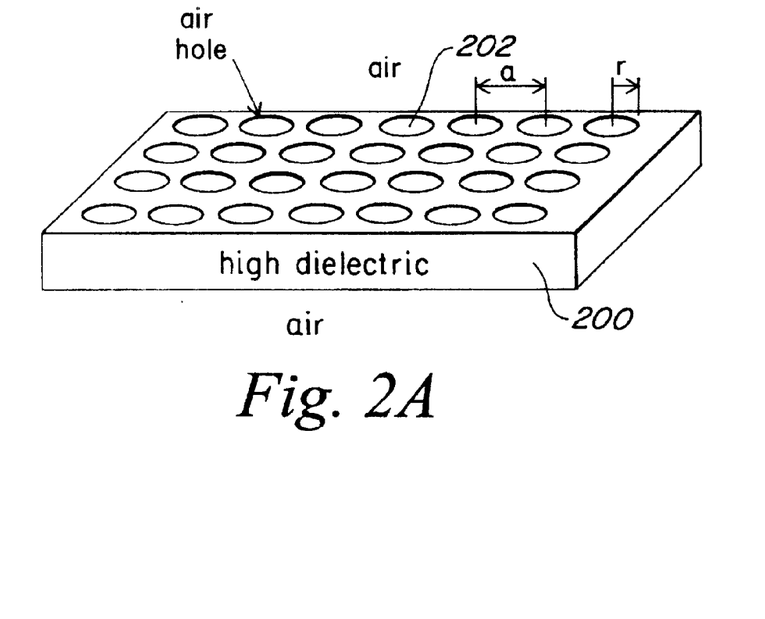
FIG. 2A is a schematic block diagram of an exemplary dielectric layer containing a periodic dielectric constant.
Figure 2B:
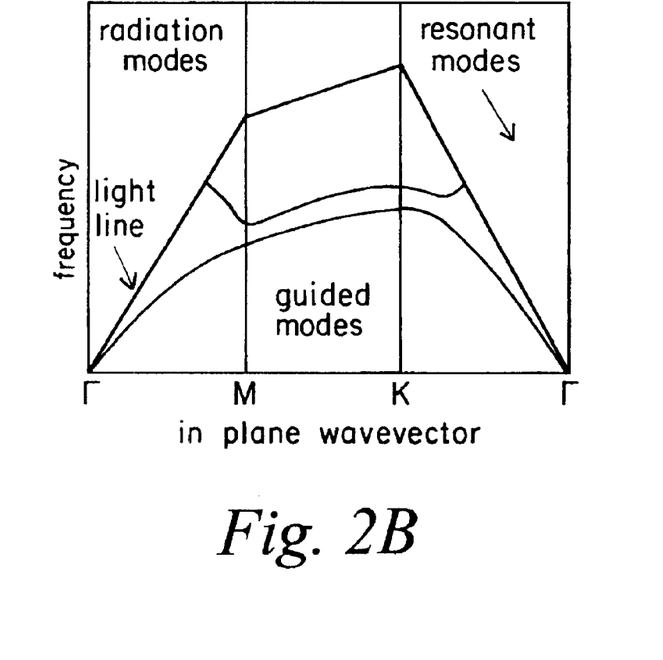
FIG. 2B is a schematic of the dispersion relation for the periodic dielectric structure in FIG. 2A.

FIG. 2A is a schematic block diagram of a similar slab 200 of dielectric material as FIG. 1A, except now containing, as an exemplary embodiment of the invention, a periodic triangular lattice of holes 202 filled with a material of lower dielectric constant. For this. example, the holes in FIG. 2A are filled with air and the entire periodic dielectric layer is also surrounded by air. The distance between the holes is termed the lattice constant (a) and each hole has the same radius (r). FIG. 2B is a schematic of the dispersion relation for the structure shown in FIG. 2A. As in FIG. 1B, frequency is plotted versus the in-plane wavevector. The periodic pattern of holes allows the dispersion relation to be entirely plotted within the first Brillioun zone as indicated in FIG. 2B.

For descriptive purposes, FIG. 2B includes a graph of two generic optical modes (or bands). In reality, a spectrum of electromagnetic modes exists with either the electric field polarized in the plane of the slab (transverse electric or TE modes), or the magnetic field polarized in the plane of the slab (transverse magnetic or TM modes). The high dielectric contrast between the effective dielectric constant of the periodic structure and the surrounding lower dielectric medium creates guided modes that lie below the light line with most of their field intensity concentrated in the slab. An effect of the periodicity in the dielectric constant is to introduce electromagnetic resonant modes that lie above the light line, but still confine the majority of their field intensity inside the slab; the resonant modes provide a pathway for the transfer of the incident light at frequencies and directions that lie above the light line to guided modes that lie strictly below the light line.

Figure 3A:
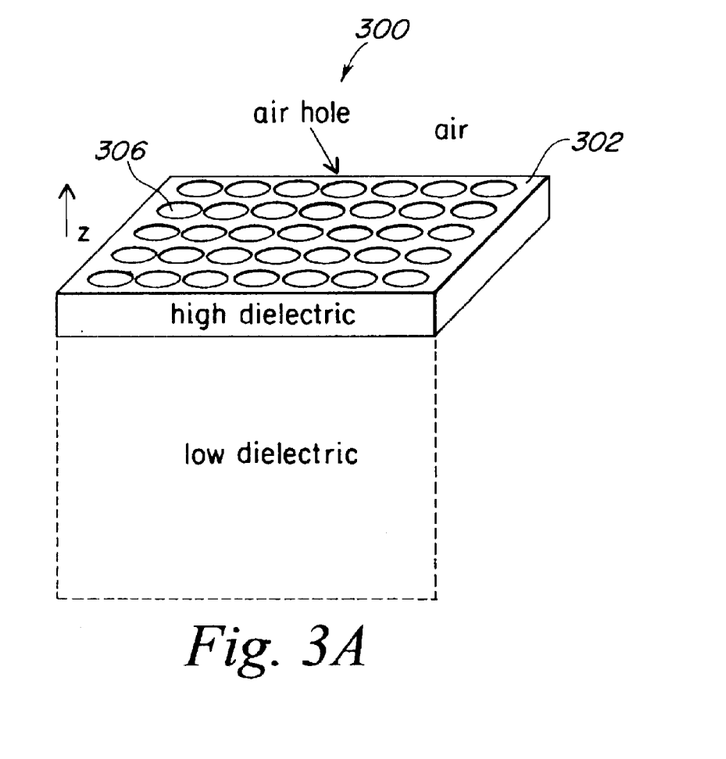
FIG. 3A is a schematic block diagram of the periodic dielectric layer from FIG. 2A on top of a low-dielectric layer.
Figure 3B:
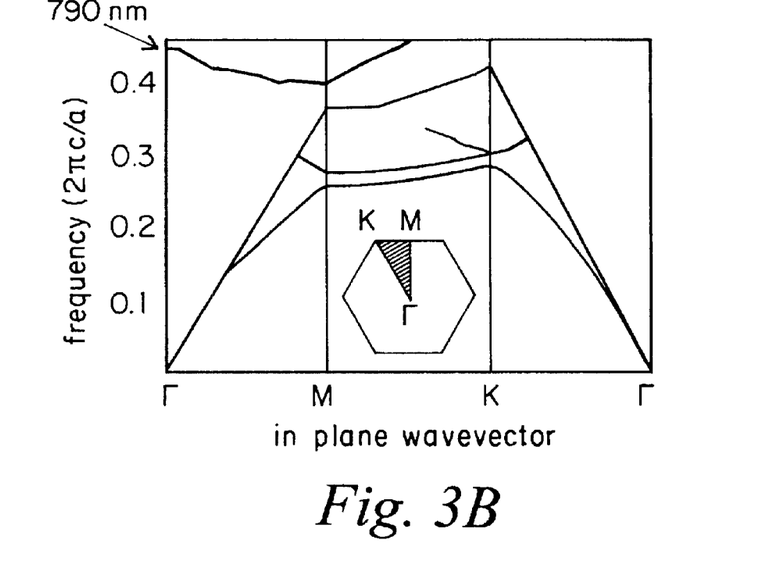
FIG. 3B is a graph of the dispersion relation for the structure in FIG. 3A.

FIG. 3A is a schematic block diagram of a structure 300 with a periodic dielectric layer 302 similar to that of FIG. 2A, positioned on top of a thick layer 304 of lower dielectric constant than that of the periodic dielectric layer. As an example, the thick low dielectric layer is taken to be $Al_xO_y$ with a dielectric constant of 2.6. FIG. 3B is a graph of a particular optical mode calculated for the structure 300 shown in FIG. 3A, which contains a triangular lattice of holes 306 with a=340 nm, r=104 nm, and a hole depth (d) of 60 nm in the dielectric layer 302 with a dielectric constant of 10.43. The total thickness of the dielectric layer 302 is 0.4a=135 nm. The frequency is plotted in units of $(2\pi c/a)$ versus the in-plane wavevector. The details of the calculation method are provided in Meade et al., "Accurate Theoretical Analysis of Photonic Band-Gap Materials," Phys. Rev. B., 48, 8434, (1993), incorporated herein by reference.

The holes 306 do not penetrate the entire dielectric layer 302 for the purpose of testing the input coupling as will be described in reference to FIG. 4D. Again, a spectrum of electromagnetic modes is created due to the periodicity in the dielectric layer. Radiation modes are separated from strictly guided modes by the light line of the $Al_xO_y$. The light line of air will lie above the light line of the $Al_xO_y$, but is omitted for sake of clarity. As described with reference to FIG. 2B, resonant modes concentrating their field intensity in the periodic dielectric layer are created that may couple to radiation modes that propagate outside of the structure.

Figure 3C:
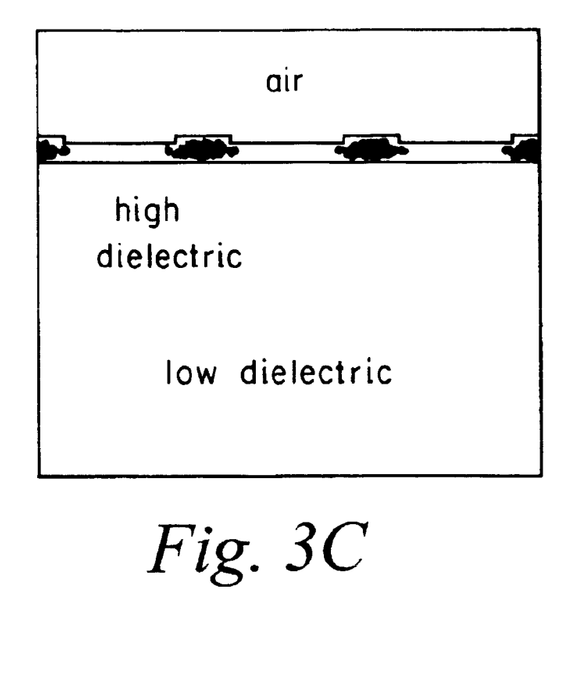
FIG. 3C is a side-view plot of the electric field intensity for a resonant mode at the $\Gamma$ point in the structure in FIG. 3A.
Figure 3D:
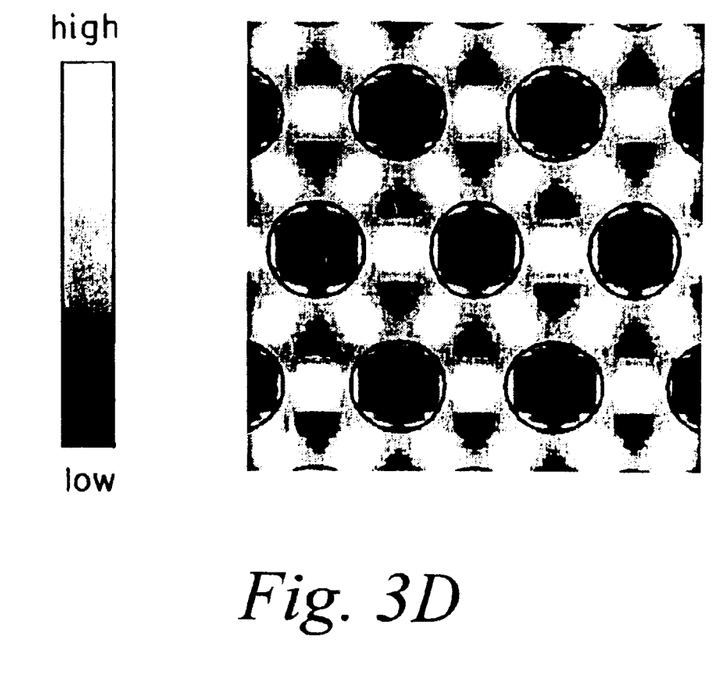
FIG. 3D is a top-view plot of the electric field intensity for a resonant mode at the $\Gamma$ point in the structure in FIG. 3A.

In particular, a resonance at the $\Gamma$ point is calculated to be near 0.4304 $(2\pi c/a)$, which corresponds to 790 nm. The $\Gamma$ point corresponds to light with a wavevector pointing only in the z-direction as oriented in FIG. 3A (at normal incidence to the plane of the periodic pattern of holes). FIG. 3C is a side-view plot of the electric field intensity for a mode resonant in the structure in FIG. 3A that lies at the $\Gamma$ point on the dispersion relation in FIG. 3B. FIG. 3D is a top-view plot of the electric field intensity for the same resonance as that plotted in FIG. 3C. The electric field intensities plotted in FIG. 3C and FIG. 3D are derived from the dispersion relation for the structure 300 in FIG. 3B. More than 99% of the electric field intensity is concentrated in the dielectric region even though the resonance lies above the light line.

Figure 4A:
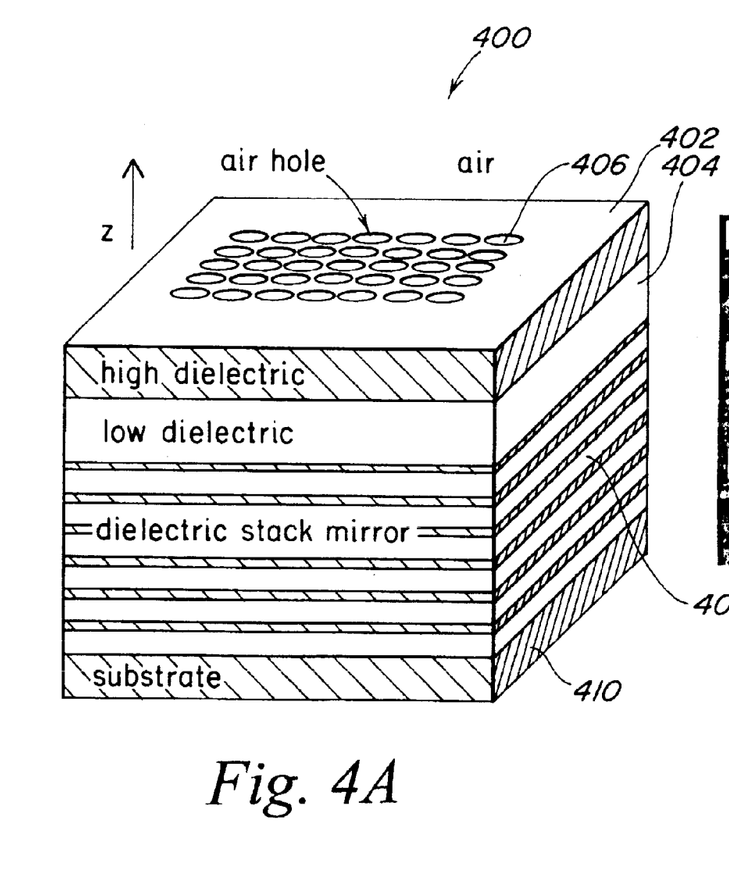
FIG. 4A is a schematic block diagram of an exemplary input coupling device similar to that in FIG. 3A, except fabricated on top of a mirror with alternating layers of low and high dielectric material, and a substrate.

FIG. 4A is a schematic block diagram of an exemplary input-coupling device 400 in accordance with the invention. The realized structure is similar to that described with reference to FIG. 3A (dielectric layer 402, holes 406, thick dielectric layer 404) with the addition of a dielectric stack mirror 408 and a substrate 410 located beneath the low-dielectric spacer layer. The structure 400 includes, for example, an asymmetric InGaP/InGaAs dielectric slab on top of a low dielectric $Al_xO_y$ spacer layer and an $Al_xO_y$/GaAs distributed Bragg reflector (DBR) on a GaAs substrate.

The asymmetric active region consists of 32 nm of InGaP beneath an 8 nm InGaAs quantum well (QW); the upper InGaP has a thickness of 95 nm. The purpose of the QW is to absorb the light coupled into the structure and reemit light at a different wavelength that may then be detected. The photoluminescence (PL) spectrum exhibits a full-width at half-maximum (FWHM) for the QW of ~65 nm at room temperature. The holes do not penetrate the InGaAs QW. The asymmetry of the active region, however, allows the etched holes of the photonic crystal to be deep enough to yield the resonant mode depicted in FIG. 3B. The DBR stop band ranges from 800–1300 nm and reflects the QW emission. A 30 $\mu$m×30 $\mu$m photonic crystal region is centered within either a 50 $\mu$m or a 100 $\mu$m square mesa.

Figure 4B:
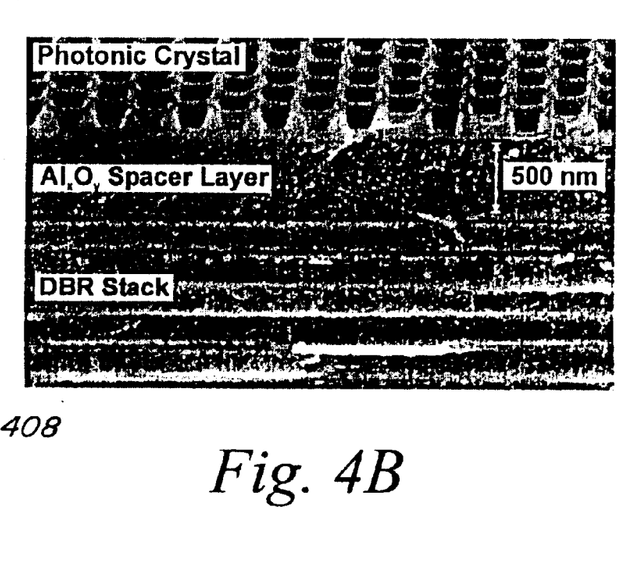
FIG. 4B is a scanning electron micrograph of a cross-sectional view of the input-coupling device in FIG. 4A.

The device 400 is fabricated using direct write electron beam lithography, photolithography, electron beam evaporation, reactive-ion etching, and thermal oxidation processes. FIG. 4B is a scanning electron micrograph (SEM) of a cross-section through one such input-coupling device.

Figure 4C:
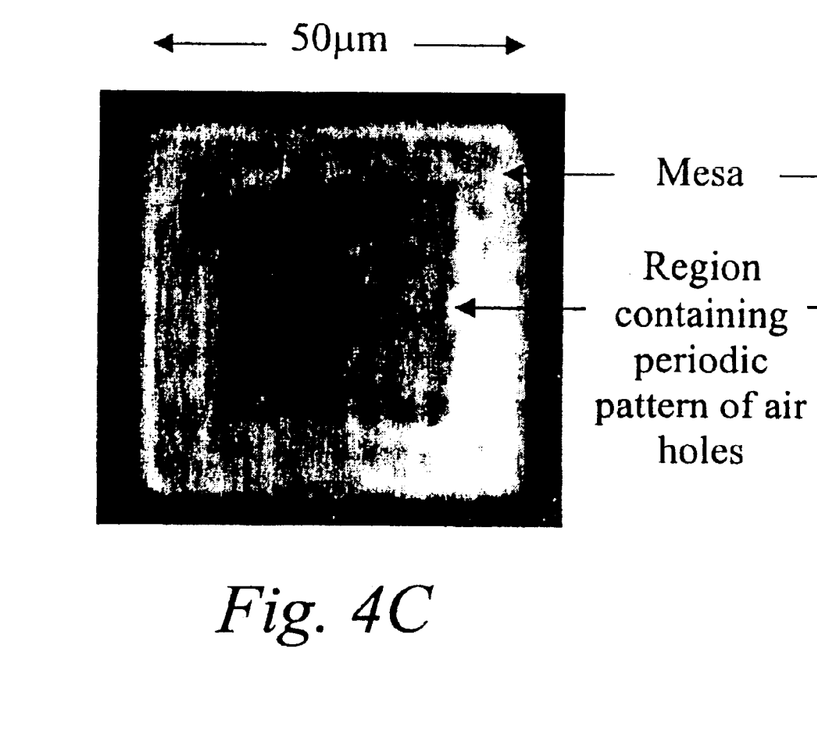
FIG. 4C is an image of the reflection of input light from the input coupling device in FIG. 4A.

FIG. 4C is an image of the reflection of the incident 810 nm light-from the input coupling device in FIG. 4A taken with a coupled charge device (CCD) camera. The input light is generated with a continuous wavelength Ti:$Al_2O_3$ laser. The focusing lens has a numerical aperture of 0.25. A decrease in the reflection of the 810 nm input light at normal incidence to the surface of the mesa occurs in the region of the periodic pattern of holes, relative to the surrounding dielectric material without the periodic pattern of holes. The 810 nm input light couples to the $\Gamma$ point resonance that is created by the periodic pattern of holes as indicated in FIG. 3B. The collection angle of the focusing lens gives some spread in wavelength to the resonance at $\Gamma$.

Figure 4D:
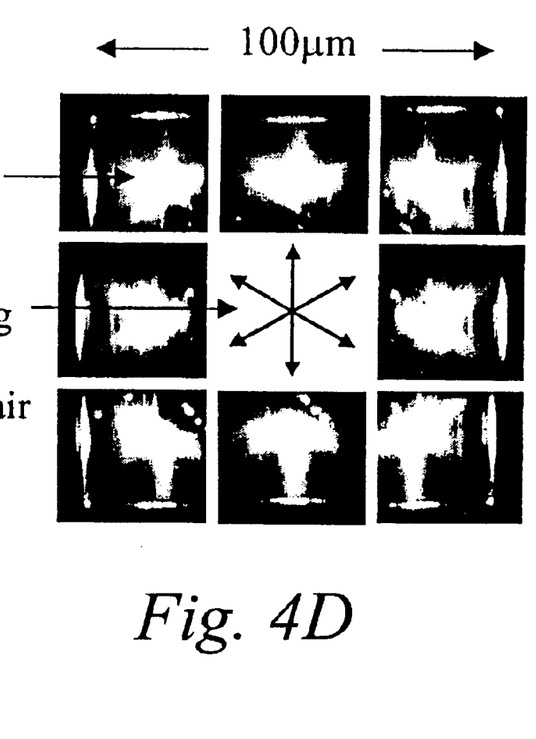
FIG. 4D is a composite image of the emission from a quantum well disposed between the periodic dielectric layer and the spacer layer as indicated in FIG. 4A

FIG. 4D shows a composite image of eight CCD images taken with a broad spectral filter that covers the entire QW emission spectrum. For each image, the input light is focused down to a less than 5 $\mu$m diameter spot inside the edge of the periodic pattern of holes featured in FIG. 4A. The strong QW emission indicates the absorption of the input light along the six equivalent $\Gamma$M directions of the triangular lattice of holes, indicating input coupling to the resonance at the $\Gamma$ point shown in FIG. 3B. The observed symmetry of the input coupling matches the symmetry of the resonant mode as indicated in FIG. 3D.

Figure 5:
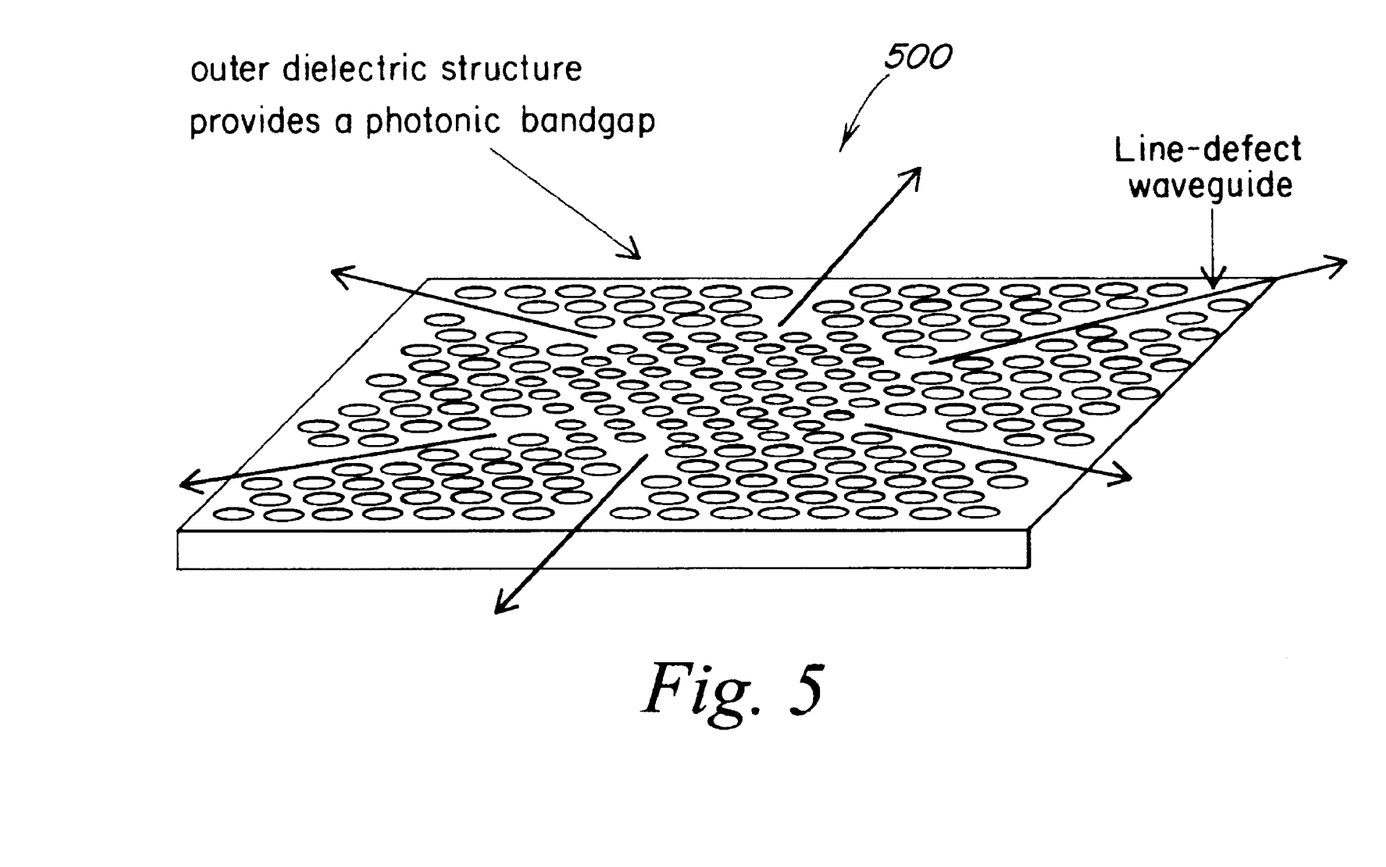
FIG. 5 is a schematic block diagram of an exemplary input-coupling device surrounded by a second periodic dielectric structure containing a photonic bandgap that overlaps the input wavelength.

FIG. 5 is a schematic block diagram of an input-coupling dielectric structure 500 surrounded by a second periodic dielectric structure that contains a photonic bandgap overlapping the input wavelength. Line-defects are defined within the outer periodic dielectric structure and provide output waveguides for the in-coupled optical signal. Photonic bandgaps and defects within periodic dielectric structures are described in detail in Joannopoulos et al., *Photonic Crystals, Molding the Flow of Light,* (Princeton University Press, Princeton, 1995), incorporated herein by reference.

The line-defects are positioned along the six-equivalent ΓM directions of the triangular lattice of holes as motivated by the result described in reference to FIG. 4D. The structure 500 may be placed, for example, on a low-dielectric spacer layer and a dielectric stack mirror as described in reference to FIG. 3A; the additional layers were omitted from the schematic in FIG. 5 for sake of clarity.

Although the present invention has been shown and described with respect to several preferred embodiments thereof, various changes, omissions and additions to the form and detail thereof, may be made therein, without departing from the spirit and scope of the invention.

What is claimed is:

1. An input light-coupling device comprising a dielectric structure with a dielectric layer including a pattern of dielectric contrast distributed in at least two dimensions, said pattern being arranged so as to optimally transfer at least one wavelength of electromagnetic radiation from a medium of smaller dielectric constant into said dielectric layer so that the transferred electromagnetic radiation is propagated within said dielectric layer in the in-plane direction of said dielectric layer.

2. The device of claim 1, wherein said dielectric layer comprises a pattern of dielectric contrast that is periodic in two dimensions.

3. The device of claim 2, wherein said dielectric layer comprises a periodic pattern of dielectric elements within a layer of different dielectric constant than that of said elements.

4. The device of claim 3, wherein said dielectric structure comprises a plurality of layers at least one of which contains said periodic pattern of dielectric elements.

5. The device of claim 3, wherein the periodicity of the dielectric layer terminates in the plane of said layer leaving a uniform dielectric material of said layer surrounding the periodic dielectric region, and bounded itself above and below by said medium of lower dielectric constant.

6. The device of claim 5 further comprising:

a substrate; and a spacer layer with a dielectric constant below the dielectric constant of said substrate and positioned between said dielectric layer and the substrate.

7. The device of claim 6 further comprising a mirror between said substrate and said spacer layer.

8. The device of claim 7, wherein said mirror comprises alternating layers of dielectric material.

9. The device of claim 8, wherein said mirror comprises a reflective material.

10. The device of claim 6, wherein the periodic pattern extends through layers below said dielectric layer.

11. The device of claim 6, wherein said surrounding medium above said dielectric layer comprises an optical fiber.

12. The device of claim 6, wherein said surrounding medium above said periodic dielectric layer is free space.

13. The device of claim 6, wherein surrounding said dielectric structure are dielectric waveguides.

14. The device of claim 6, wherein surrounding said dielectric structure is a second periodic dielectric structure of a different periodicity than said periodic pattern.

15. The device of claim 14, wherein said second periodic dielectric structure comprises a photonic band gap or a range of frequencies in which light propagation is forbidden.

16. The device of claim 15, wherein the photonic band gap overlaps the wavelength of input light.

17. The device of claim 16, wherein within said second periodic dielectric structure are waveguides formed by constructing line defects that break the periodicity of said second periodic dielectric structure, the waveguides being defined along the directions of high-symmetry for said dielectric structure.

18. The device of claim 6 further comprising an optical cavity within said dielectric layer.

19. The device of claim 18, wherein output waveguides are positioned at the boundary of said optical cavity so that input light may couple through said dielectric structure exciting an optical mode inside said optical cavity, and light from said optical mode leaks into said output waveguides.

20. The device of claim 1, wherein said dielectric layer comprises an active medium and said dielectric structure facilitates optical pumping of said active medium.

21. The device of claim 20, wherein said active medium is also electrically pumped.

22. The device of claim 20, wherein said active medium comprises a light-emitting diode (LED).

23. The device of claim 20, wherein said active medium surrounds said periodic dielectric structure.

24. The device of claim 20, wherein light of at least one wavelength output from said active medium is input into a second dielectric layer through a second periodic dielectric structure positioned within said second dielectric layer.

* * * * *